(12) United States Patent
Blake

(10) Patent No.: US 6,685,206 B1
(45) Date of Patent: Feb. 3, 2004

(54) SIMPLIFIED CYCLE MOUNTING ASSEMBLY, INCLUDING FOR A TRICYCLE

(75) Inventor: T. Gregory Blake, Madison, WI (US)

(73) Assignee: Pacific Cycle LLC, Vernon Hills, IL (US)

( * ) Notice: Subject to any disclaimer, the term of this patent is extended or adjusted under 35 U.S.C. 154(b) by 0 days.

(21) Appl. No.: 10/160,137

(22) Filed: May 31, 2002

(51) Int. Cl.[7] .......................... B62K 5/06; B62K 15/00; B62K 19/36; B62K 21/24
(52) U.S. Cl. .................. 280/278; 280/279; 280/282; 280/287; 280/657; 297/215.14
(58) Field of Search ................ 280/278, 287, 280/279, 282, 288, 638, 657, 62, 47.371, 47.315, 655.1; 297/195.1, 215.14, 215.13; 403/322.2, 325, 377, DIG. 6, 109.3

(56) References Cited

U.S. PATENT DOCUMENTS

| | | | | |
|---|---|---|---|---|
| 564,741 A | * | 7/1896 | Dunn | 403/362 |
| 612,989 A | * | 10/1898 | Hunter et al. | 403/321 |
| 2,232,661 A | * | 2/1941 | Hedstrom | 280/282 |
| 2,619,364 A | * | 11/1952 | Carson | 280/287 |
| 3,955,828 A | * | 5/1976 | Boudreau | 280/279 |
| 4,077,351 A | * | 3/1978 | Girona | 440/30 |
| 4,168,846 A | * | 9/1979 | Carren | 280/278 |
| 4,732,403 A | * | 3/1988 | Grattapaglia | 280/278 |
| 4,836,604 A | * | 6/1989 | Romano | 297/215.14 |
| 5,419,573 A | * | 5/1995 | Kao | 280/278 |
| 5,513,895 A | * | 5/1996 | Olson et al. | 297/215.14 |
| 5,779,386 A | * | 7/1998 | Eichhorn | 403/329 |
| 5,988,741 A | * | 11/1999 | Voss et al. | 297/215.15 |
| 6,505,845 B1 | * | 1/2003 | Fong | 280/228 |

FOREIGN PATENT DOCUMENTS

DE 4237864 * 5/1994

* cited by examiner

Primary Examiner—Anne Marie Boehler
(74) Attorney, Agent, or Firm—Andrus, Sceales, Starke & Sawall, LLP

(57) ABSTRACT

In cycles, including tricycles, having a longitudinally extending frame supporting a front wheel and a subframe including a rear axle supporting a pair of laterally spaced rear wheels, and supporting a seat for a rider, and having a headtube comprising a tubular member extending axially along a steering axis, a front handlebar stem comprising a tubular member extending axially downwardly into the headtube, and a front wheel fork yoke comprising a tubular member extending axially upwardly into the headtube, simplified quick tool-free mounting assemblies are provided, including a tool-free frame-to-subframe mounting assembly mounting the frame to the subframe with an insertion motion requiring no tools, a tool-free seat-to-frame mounting assembly removably and adjustably mounting the seat to the frame with an insertion motion along the direction of travel of the cycle and requiring no tools, and a tool-free stem-to-yoke mounting assembly mounting the stem to the yoke with an insertion motion requiring no tools.

19 Claims, 10 Drawing Sheets

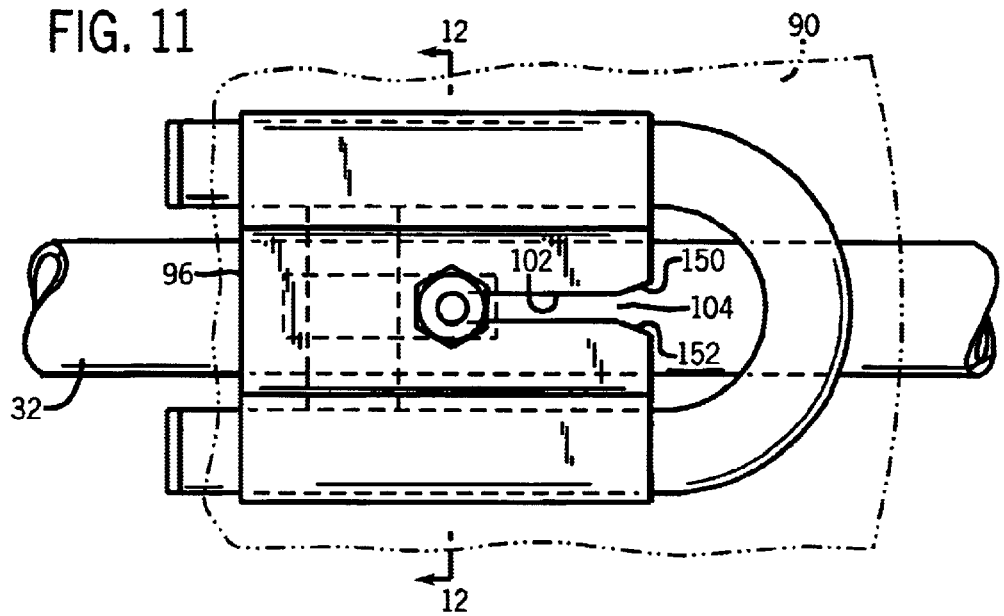
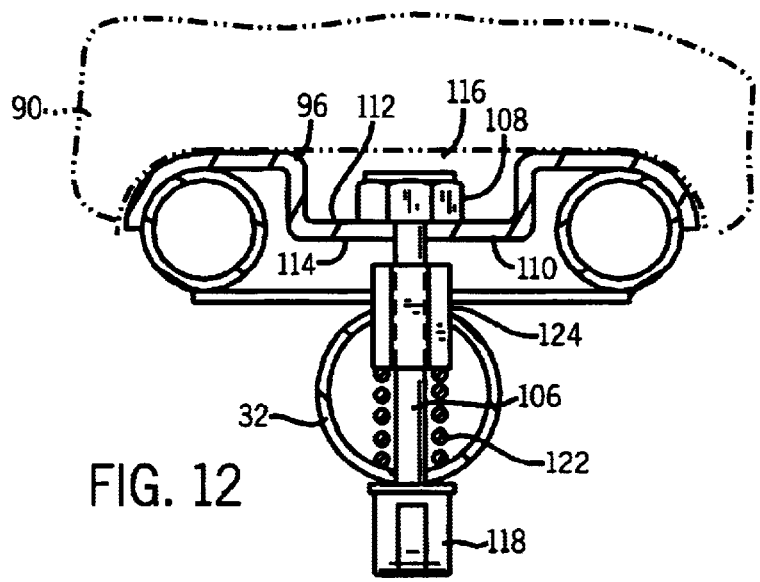

SIMPLIFIED CYCLE MOUNTING ASSEMBLY, INCLUDING FOR A TRICYCLE

BACKGROUND AND SUMMARY

The invention relates to cycles, including tricycles, and more particularly to customer friendly simplified assembly systems, including no-tool quick assembly apparatus and methods.

The invention arose out of development efforts directed toward simplified assembly of cycles, including tricycles and the like. Shipping a cycle in fully assembled condition is typically cost-prohibitive, and hence the cycle is usually shipped in pieces, which in turn requires assembly either at the retail outlet or at home by the consumer. There is an increasing demand for simplified, quick assembly. There is also demand for fool-proof assembly, particularly by parents when the rider is a child, to ensure a safe, reliable, properly assembled unit. There is also demand for relatively child-proof disassembly, i.e. preventing disassembly by the child, but permitting disassembly by an adult.

The present invention provides a simplified, quick mounting assembly for a cycle, including a tricycle. In the preferred embodiment, the invention enables assembly without tools. Also in the preferred embodiment, the invention enables assembly only in a prescribed manner, to prevent improper installation. In preferred form, assembly is accomplished by a simple snap-in insertion step, and affirmative installation feedback is provided by an audible and tactile click confirming snap-in alignment and engagement, and proper, successful installation. Also in the preferred embodiment, disassembly is relatively child-proof Furthermore, the invention also lowers shipping cost by enabling more compact, lower profile packaging in pre-assembled condition.

BRIEF DESCRIPTION OF THE DRAWINGS

FIG. 10 is taken along 10—10 of FIG. 1.

FIG. 11 is a view taken along line 11—11 of FIG. 10.

FIG. 12 is a view taken along line 12—12 of FIG. 11.

DETAILED DESCRIPTION

Figure 1:
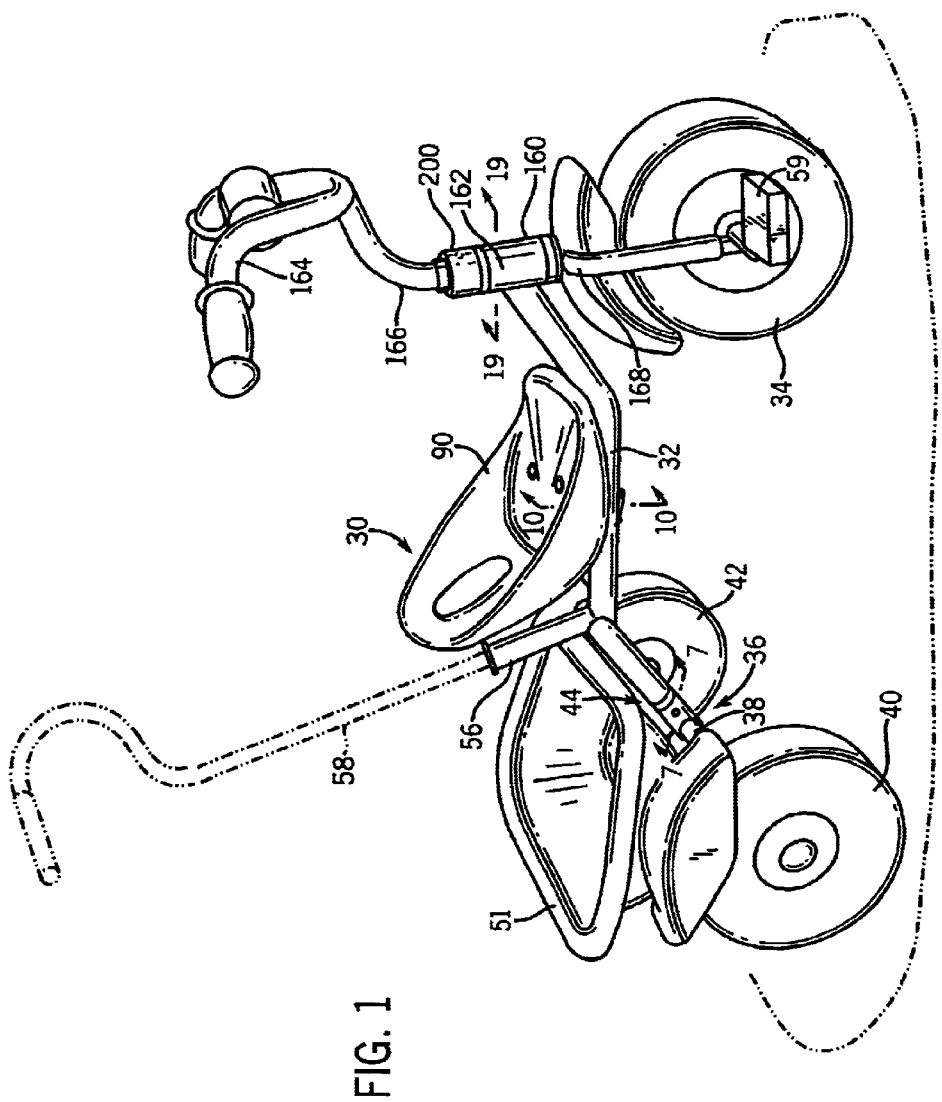
FIG. 1 is a perspective view of an assembled cycle in accordance with the invention.
Figure 2:
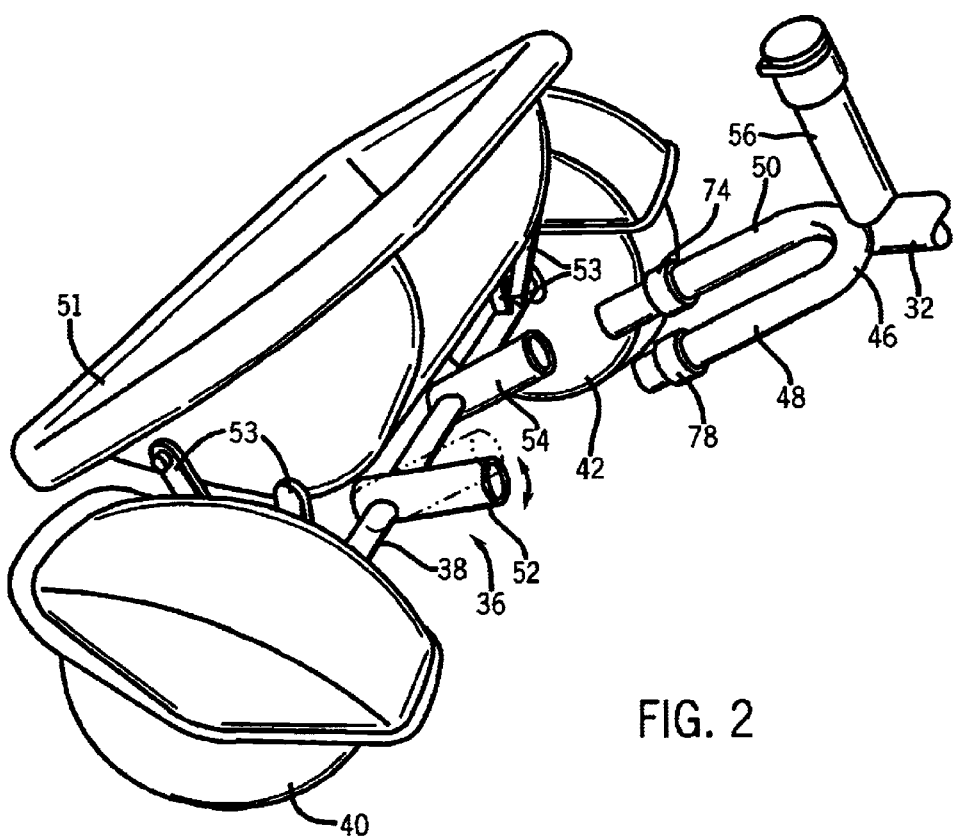
FIG. 2 is an exploded perspective view of a portion of the cycle of FIG. 1.
Figure 3:
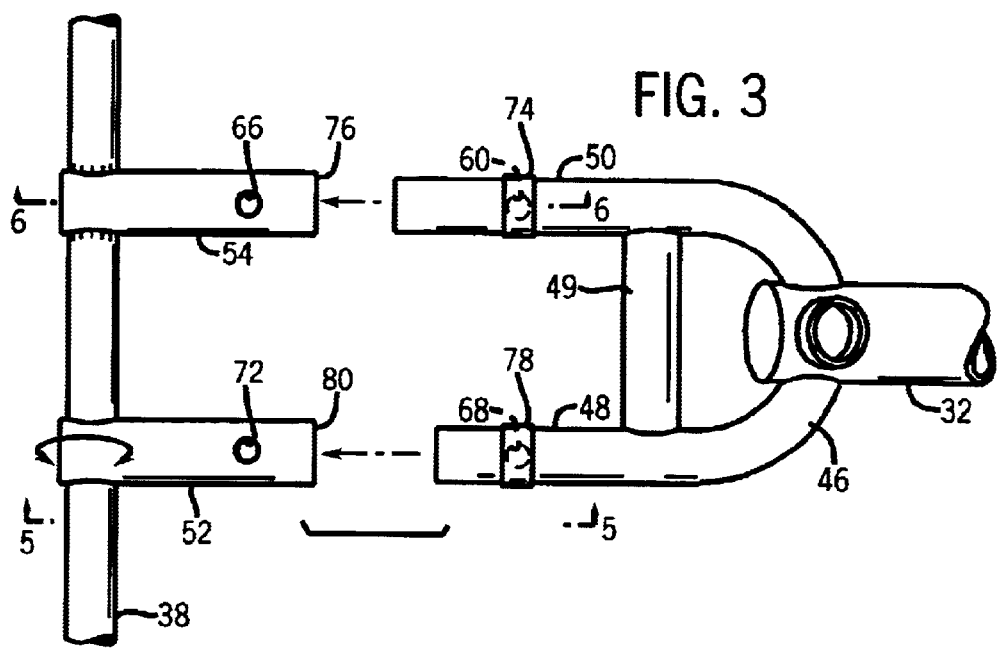
FIG. 3 is a top elevation view of a portion of the structure of FIG. 2 showing a pre-assembled condition.

FIG. 1 shows a tricycle 30 having a longitudinally extending frame 32 supporting a front wheel 34 and a subframe 36 including a rear axle 38 supporting a pair of laterally spaced rear wheels 40 and 42. A tool-free frame-to-subframe mounting assembly 44 mounts frame 32 to subframe 36 with an insertion motion, to be described, requiring no tools. The assembly mounts the frame to the subframe with snap-in insertion which is unidirectional, and once inserted is locked against withdrawal. A locking mechanism, to be described, permits the insertion and automatically locks the frame to the subframe upon such insertion, all without tools.

Frame 32 has a rear fork 46, FIGS. 2–5, having first and second legs 48 and 50 extending from frame 36 downwardly and rearwardly toward subframe 36. Subframe 36 has first and second arms 52 and 54 extending from the subframe upwardly and forwardly toward frame 32 and engaging legs 48 and 50, respectively, in inserted mating relation. Legs 48 and 50 and arms 52 and 54 provide the noted frame-to-subframe mounting assembly. The legs and arms are tubular members engaging each other with an insertion motion transverse to rear axle 38. The legs and arms engage in unidirectional rectilinear insertion relation with snap-in insertion. Leg 50 is longer than leg 48 such that leg 50 engages arm 54 before leg 48 engages arm 52. This is desirable for ease of installation because it is easier to align one pair of tubular members, e.g. 50 and 54, rather than two pairs simultaneously. To further facilitate such installation alignment, arm 52 is loosely mounted to rear axle 38 to permit relative rotation of arm 52 about axle 38 and also to allow arm 52 to be axially slidable along axle 38. In this manner, once leg 50 and arm 54 are aligned and partially inserted, arm 52 can readily be aligned with leg 48 for insertion. Arm 54 is rigidly mounted to rear axle 38. Legs 48 and 50 may have a cross brace 49 therebetween, FIGS. 3, 4, if desired for added rigidity. A basket or bucket 51 may be mounted on the rear axle if desired by supports such as 53 rigidly affixed to the axle. Frame 32 may have an upstanding tubular member 56 for removably receiving a push handle such as shown in phantom at 58, FIG. 1. A parent may insert handle 58 and push the tricycle for younger children. As the child grows, the parent can remove handle 58, and the child can propel the tricycle on his/her own by engaging pedals such as 59.

Figure 6:
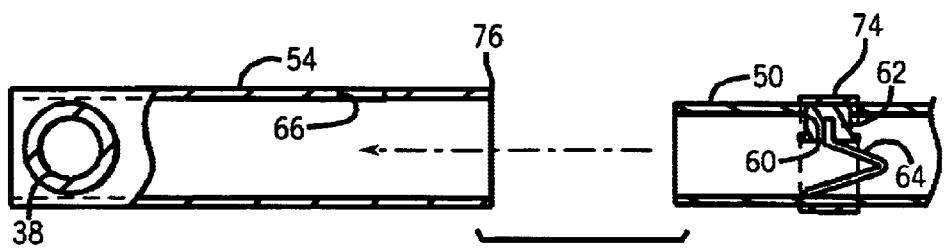
FIG. 6 is a view taken along line 6—6 of FIG. 3.

Leg 50 has an aperture 60, FIG. 6, with a locking button 62 biased by spring clip 64 to protrude therethrough. Arm 54 has an aperture 66. Upon the noted telescoping insertion, FIG. 7, aperture 60 aligns with aperture 66, and locking button 62 protrudes through aperture 60 into aperture 66, to lock leg 50 to arm 54 and prevent withdrawal thereof. Arm 48 likewise has an aperture 68, FIG. 3, with a locking button 70, FIG. 4, biased to protrude therethrough, and arm 52 has an aperture 72 aligned with aperture 68, FIG. 4, upon the noted telescoping insertion, whereby locking button 70 protrudes through aperture 68 and into aperture 72 upon such insertion, to lock leg 48 to arm 52 and prevent withdrawal thereof.

Figure 4:
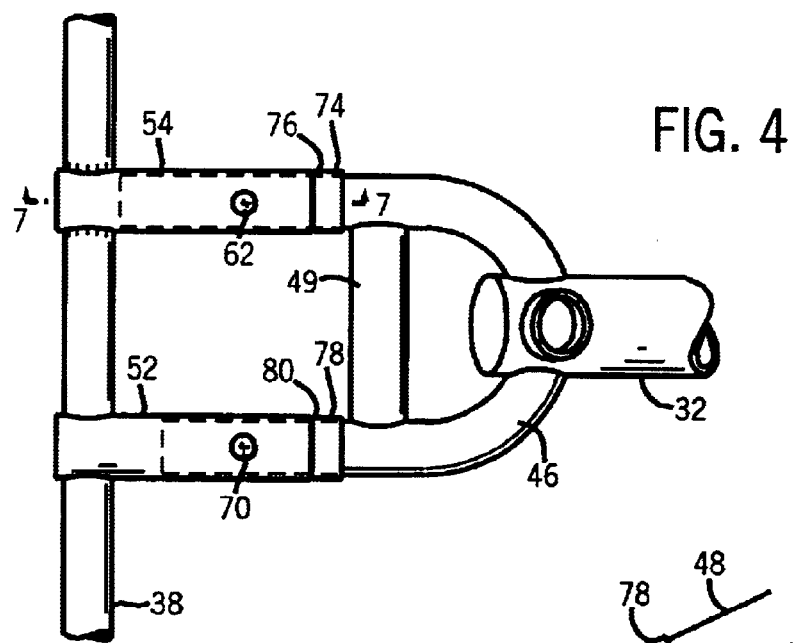
FIG. 4 is like FIG. 3 and illustrates an assembled condition.
Figure 5:
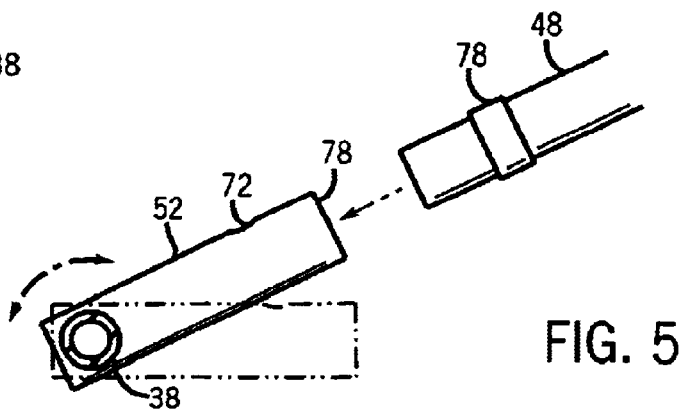
FIG. 5 is a view taken along line 5—5 of FIG. 3.
Figure 7:
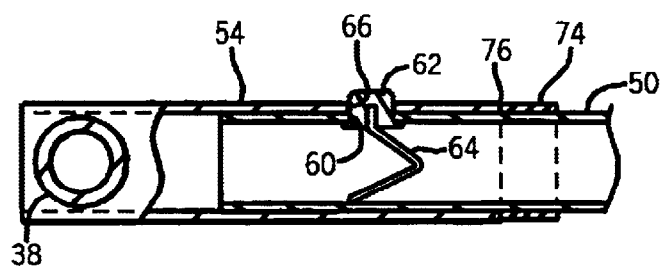
FIG. 7 is view taken along line 7—7 of FIG. 4.

Locking button 62 has a locking position, FIGS. 7, 4, protruding beyond aperture 60, and a release position recessed within aperture 60 against the bias of spring clip 64. Locking button 70 likewise has a locking position protruding beyond aperture 68, and a release position recessed within aperture 68 against the bias of a spring clip (not shown, but like spring clip 64). A pre-load member in the form of an annular collar 74, FIGS. 3, 6, on leg 50 holds locking button 62 in its release position. Collar 74 is engaged by axial end 76 of arm 54 during the noted telescoping insertion, to slide collar 74 rightwardly in FIGS. 3–7, to release locking member 62 to its locking position, i.e. to enable button 62 to move laterally outwardly (upwardly in FIG. 7) to protrude through aperture 66 of arm 54. A second pre-load member is provided by annular collar 78 on leg 48 and holding locking button 70 in its release position, and engaged by axial end 80 of arm 52 during the noted telescoping insertion, to slide collar 78 axially rightwardly in FIGS. 3, 4, to release locking button 70 to its locking position, i.e. to move laterally into aperture 72 of arm 52. The first pre-load member provided by annular collar 74 is slidable along leg 50 from a release position, FIGS. 3, 6, covering aperture 60, to a locking position, FIGS. 4, 7, uncovering aperture 60. The second pre-load member provided by collar 78 is axially slidable along leg 48 from a release position, FIG. 3, covering aperture 68, to a locking position, FIG. 4, uncovering aperture 68.

Frame 32, FIG. 1, supports a seat 90 for a rider. A tool-free seat-to-frame mounting assembly 92, FIGS. 8–12, removably and adjustably mounts seat 90 to frame 32 with an insertion motion 94, FIG. 9, along the direction of travel of cycle 30 and requiring no tools. The assembly includes a bracket 96, FIG. 8, on the underside of seat 90 and having a track 98 extending longitudinally along the direction of travel of the cycle. A locking member 100 is provided on frame 32 and is movable transversely of the noted travel direction between a clamping position, FIGS. 10, 12, engaging and clamping bracket 96 at track 98 to prevent longitudinal movement at 94 of seat 90 along frame 32, and a release position, FIG. 9, permitting such longitudinal movement of seat 90 along frame 32 and permitting removal of the seat from the frame. Bracket 96 has a longitudinal slot 102, FIGS. 8, 11, providing the noted track and having a lead-in open end 104. Locking member 100 on frame 32 includes a shank 106, FIGS. 9, 12, extending upwardly through slot 102 and having an upper flange 108. In preferred form, shank 106 is a bolt, and flange 108 is a threaded nut at the top of the bolt. Shank 106 is movable upwardly and downwardly between a lower locking position, FIGS. 10, 12, with flange 108 engaging bracket 96 in clamping relation, and an upper release position, FIG. 9, permitting bracket 96 to slide longitudinally at 94, with shank 106 extending transversely through longitudinal slot 102.

Figure 9:
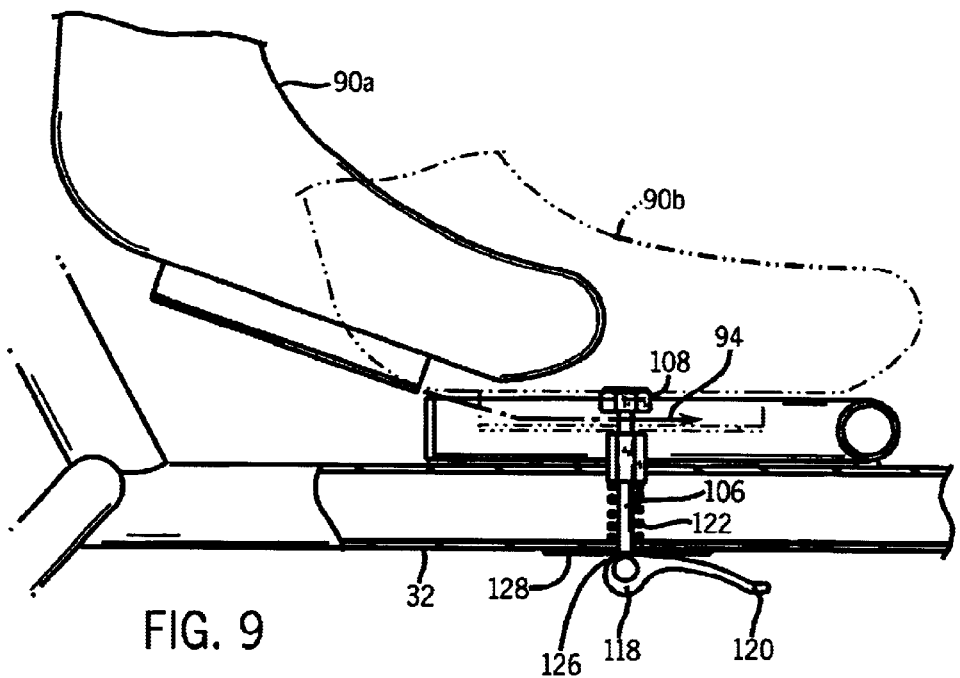
FIG. 9 is a side view partially in section of a portion of FIG. 1 illustrating a pre-assembled condition.
Figure 10:
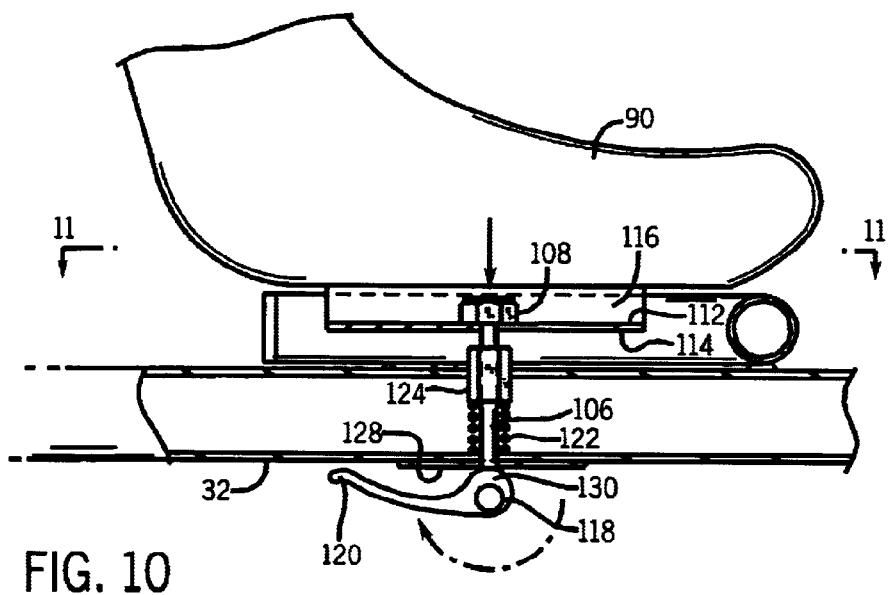
FIG. 10 is like FIG. 9 and shows an assembled condition.
Figure 13:
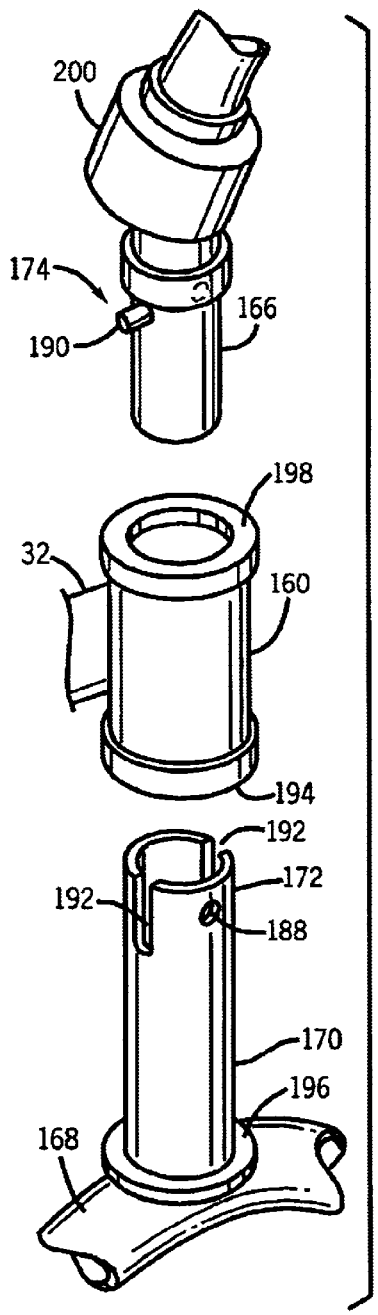
FIG. 13 is an exploded perspective view of a portion of the cycle of FIG. 1 illustrating a pre-assembled condition.
Figure 14:
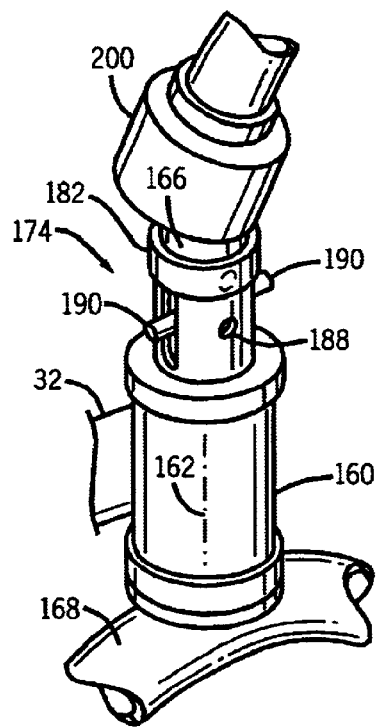
FIG. 14 is a view like FIG. 13 and illustrates the structure during assembly.
Figure 15:
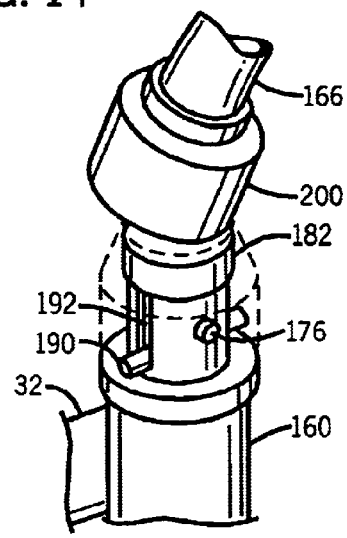
FIG. 15 is like FIG. 14 and illustrates the structure in assembled condition.
Figure 16:
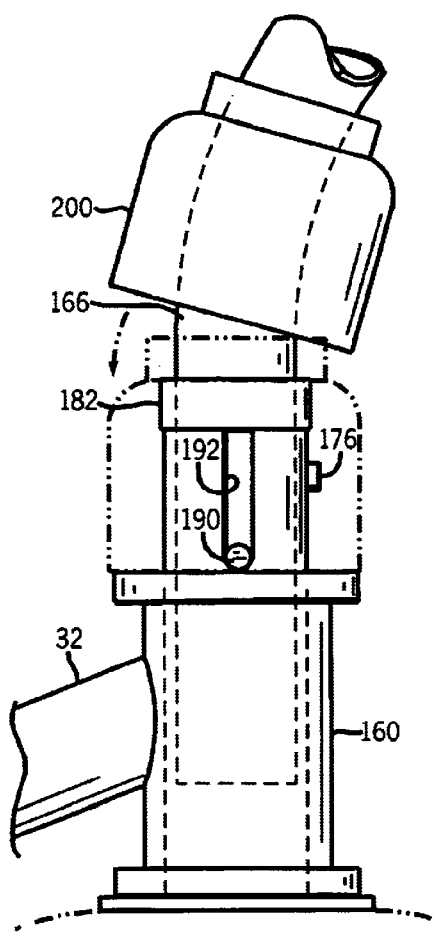
FIG. 16 is a side elevation view of the structure of FIG. 15.
Figure 17:
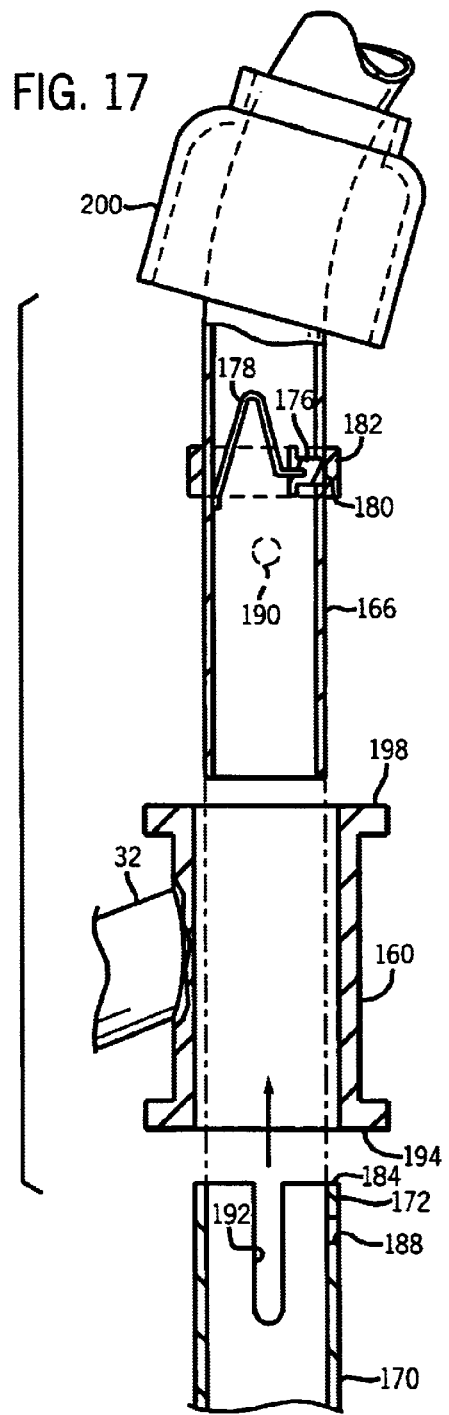
FIG. 17 is an exploded sectional view of a portion of the cycle of FIG. 1 illustrating a pre-assembled condition like FIG. 13.

Bracket 96 includes a central plate 10, FIG. 8, spaced below seat 90 and having upper and lower surfaces 112 and 114, FIGS. 12 and 10. Upper surface 112 faces seat 90 and is spaced therefrom by a vertical gap 116. Lower surface 114 faces frame 32. The flange provided by nut 108 is in gap 116 and engages upper surface 112 in the noted locking position of the shank. Shank 106 extends downwardly through frame 32 and has a lower cam 118 below the frame and a manually engagable cam lever 120 for cammingly engaging and moving shank 106 between the noted upper and lower positions. A biasing member in the form of helical compression spring 122 within frame 32 biases shank 106 to its upper release position, FIG. 9. Spring 122 bears between the inner lower surface of tubular frame 32 and a nut 124 thread mounted or otherwise secured to shank or bolt 106. In the release position of the locking member shank, lever 120 is in the position shown in FIG. 9, with the thin part 126 of the cam engaging the underside of tubular frame 32 at plate 128. In the locking position of the locking member shank 106, lever 120 is in the position shown in FIG. 10, with the thick portion 130 of the cam engaging the underside of the tubular frame at plate 128.

Figure 8:
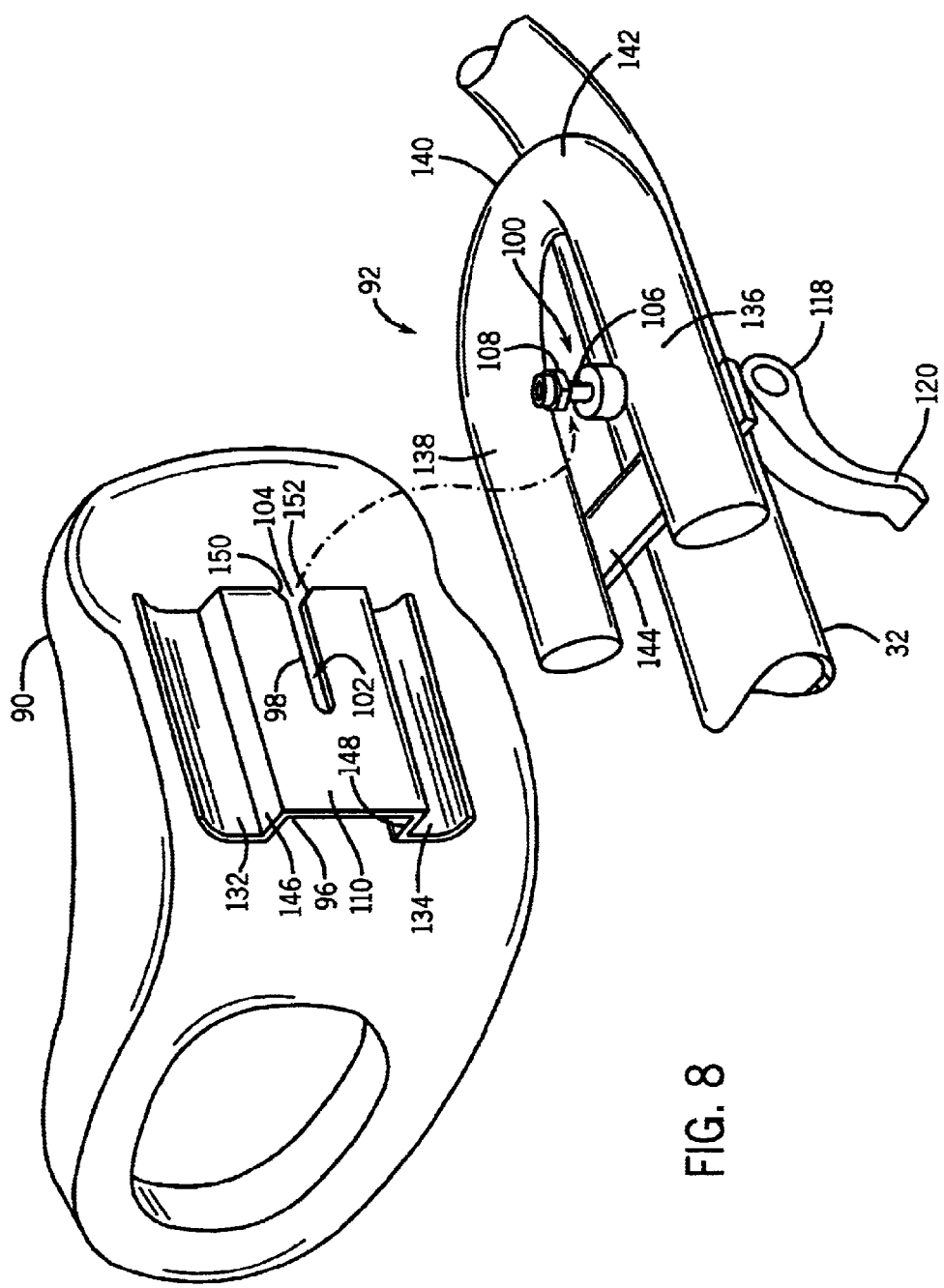
FIG. 8 is an exploded perspective view folded away of a portion of the cycle of FIG. 1.

Bracket 96 has a pair of downwardly facing longitudinally extending channels 132 and 134, FIG. 8, spaced on laterally opposite sides of slot 102. Frame 32 has a pair of upwardly facing longitudinally extending rails 136 and 138 on laterally opposite sides of shank 106 and receiving channels 132 and 134, respectively, and supporting bracket 96 for longitudinal movement therealong. A tubular U-shaped member 140 on frame 32 provides the noted rails. The U-shaped member has a pair of longitudinally extending tubular legs 136 and 138 joined by a laterally extending bight 142, and which may be further reinforced by a cross brace 144. Brace 96 has a central portion provided by the noted central plate 110 with slot 102 therein, and a pair of sidewalls 146 and 148 laterally spaced on opposite sides of slot 102 and extending from central portion 110 upwardly to channels 132 and 134, respectively. Lead-in open end 104 of slot 102 is beveled along a taper 150, 152, FIGS. 8, 11, to provide a widened entrance throat at 104 having a greater lateral width than slot 102 and guiding entry of shank 106 into slot 102 during the noted longitudinal insertion at 94 along the direction of travel of the cycle. Seat 90 is initially tipped and angled downwardly as shown at 90a in FIG. 9 to guide shank 106 into lead-in open end throat 104, and then the seat is slid forwardly as shown at 94 while the rear end of the seat is lowered, so that the seat slides horizontally forwardly to the position shown in FIG. 9 at dashed line 90b. The seat is adjusted fore-aft to a desired adjustment location, and then cam lever 120 is rotated clockwise from the position in FIG. 9 to the position in FIG. 10 to clampingly lock the seat in position.

Frame 32 has a headtube 160, FIG. 1, provided by a tubular member extending axially along a steering axis 162. Front handlebars 164 have a lower central stem provided by a tubular member 166, FIGS. 13–19, extending axially downwardly into headtube 160. Front wheel fork 168 supports front wheel 34 and has an upper central tubular yoke 170, FIGS. 13–19, extending axially upwardly into headtube 160 and engaging tubular stem 166 in telescoping relation. One of the stem and yoke, preferably yoke 170, has an externally extended portion 172 extending axially through and beyond headtube 160. A tool-free stem-to-yoke mounting assembly 174 external of headtube 160 mounts stem 166 to yoke 170 with an insertion motion, to be described, requiring no tools. The assembly step is a snap-in unidirectional insertion, and once inserted is locked against withdrawal.

Figure 18:
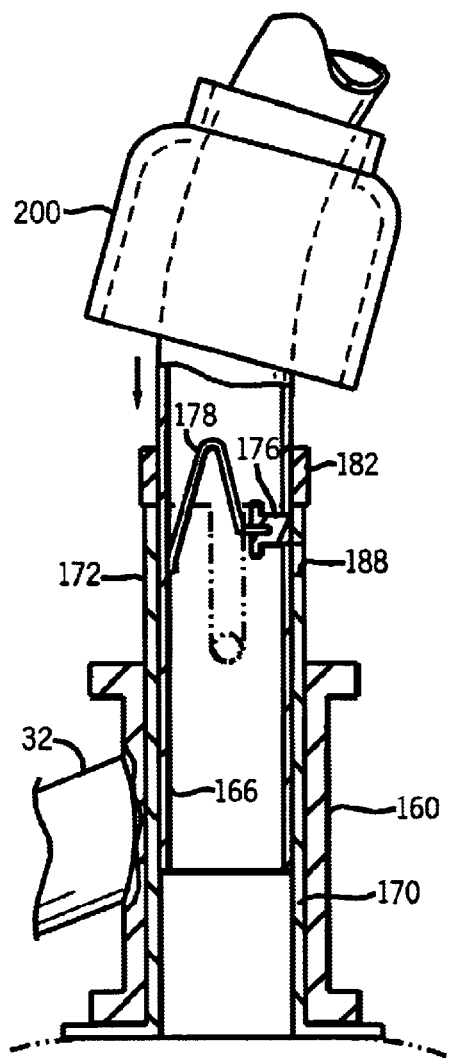
FIG. 18 is a view like FIG. 17 and illustrates the structure during assembly.
Figure 19:
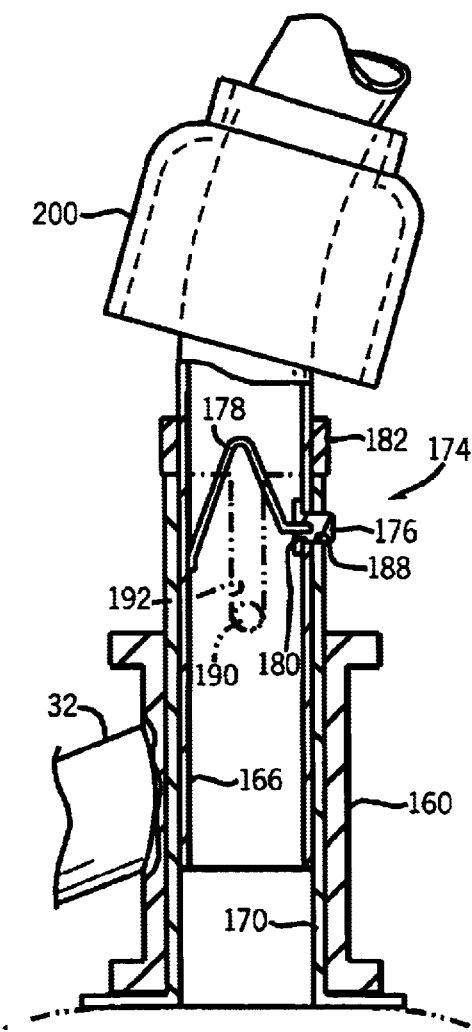
FIG. 19 is like FIG. 18 and illustrates the structure upon completion of assembly.

The tubular members of yoke 170 and stem 166 preferably engage each other in telescoping relation. A locking mechanism, to be described, preferably external of headtube 160, coacts between the stem and yoke and permits the noted insertion and locks the stem to the yoke to prevent withdrawal of the stem from the yoke, and also locks the stem and yoke against withdrawal from the headtube, all without tools. An anti-rotation mechanism, to be described, coacts between the stem and yoke and prevents relative rotation therebetween. One of the stem and yoke, preferably the stem, has a biased locking member in the form of a locking button 176, FIGS. 17–19, having a locking position, FIG. 19, and a release position, FIG. 17. Locking button 176 is biased by spring clip 178 to protrude through aperture 180 in the tubular sidewall of stem 166. A pre-load member or release band in the form of an annular collar 182 around tubular stem 166 holds locking button 176 in its release position recessed in aperture 180. Collar 182 is engaged by axial end 184 of externally extended portion 172 of tubular yoke 170 during the noted insertion. During such telescoping insertion, axial end 184 of yoke 170 engages and pushes collar 182 axially upwardly as shown in FIG. 18 to release locking pin 176 to snap laterally outwardly under the bias of spring clip 178 into aperture 188 in yoke 170, FIG. 19. This is the locking position, with locking member 176 engaging yoke 170 at aperture 188 to lock stem 166 to yoke 170. The tubular members providing stem 166 and yoke 170 also have mating detents 190 and 192, FIG. 13, axially slidable along each other during the noted telescoping insertion and providing the noted anti-rotation mechanism. The detents are provided by one or more open ended axially extending slots 192 in yoke 170, and one or more laterally extending pegs 190 on stem 166 extending laterally into respective slots 192 and axially slidable therealong. After insertion, the lower axial end 194 of headtube 160 rests on and is supported by front wheel fork yoke 168 at annular ring 196. Locking member 176 and the anti-rotation mechanism provided at peg 190 in slot 192 are external of the headtube and above the upper axial end 198 thereof and prevent withdrawal of stem 166 and yoke 170 from headtube 160. After the noted insertion, an outer protective cover sheath 200 is slid downwardly along stem 166 to cover the noted locking mechanism and anti-rotation mechanism.

The frame-to-subframe mounting assembly in combination with the seat-to-frame mounting assembly in combination with the stem-to-yoke mounting assembly provides simplified, quick assembly. Each step is a single insertion. The three steps may be performed in any desired sequence. The noted snap-in insertion desirably provides affirmative installation feedback by an audible and tactile click confirming alignment and snap-in engagement, and proper, successful installation.

It is recognized that various equivalents, alternatives and modifications are possible within the scope of the appended claims.

What is claimed is:

1. In a tricycle having a longitudinally extending frame supporting a front wheel and a subframe including a rear axle supporting a pair of laterally spaced rear wheels, a tool-free frame-to-subframe mounting assembly mounting said frame to said subframe with an insertion motion requiring no tools, wherein one of said frame and said subframe has a biased locking member having a locking position and a release position, and a pre-load member holding said locking member in said release position and engaged by the other of said frame and said subframe during said insertion motion to release said locking member to said locking position engaging said other of said frame and said subframe and locking said frame to said subframe.

2. In a tricycle having a longitudinally extending frame supporting a front wheel and a subframe including a rear axle supporting a pair of laterally spaced rear wheels, a frame-to-subframe mounting assembly mounting said frame to said subframe comprising a rear fork having first and second legs extending from said frame toward said subframe, and first and second arms extending from said subframe toward said frame and engaging said legs in inserted mating relation, wherein said first leg and said first arm are tubular members engaged in telescoping relation, and said second leg and said second arm are tubular members engaged in telescoping relation, wherein one of said first leg and said first arm is longer than the respective one of said second leg and said second arm such that said first leg engages said first arm before said second leg engages said second arm.

3. In a tricycle having a longitudinally extending frame supporting a front wheel and a subframe including a rear axle supporting a pair of laterally spaced rear wheels, a frame-to-subframe mounting assembly mounting said frame to said subframe comprising a rear fork having first and second legs extending from said frame toward said subframe, and first and second arms extending from said subframe toward said frame and engaging said legs in inserted mating relation, wherein said first leg and said first arm are tubular members engaged in telescoping relation, and said second leg and said second arm are tubular members engaged in telescoping relation, wherein said first arm is rigidly mounted to said rear axle, and said second arm is loosely mounted to said rear axle to permit relative rotation of said second arm about said rear axle.

4. The tricycle according to claim 3 wherein said second arm is axially slidable along said rear axle.

5. In a tricycle having a longitudinally extending frame supporting a front wheel and a subframe including a rear axle supporting a pair of laterally spaced rear wheels, a frame-to-subframe mounting assembly mounting said frame to said subframe comprising a rear fork having first and second legs extending from said frame toward said subframe, and first and second arms extending from said subframe toward said frame and engaging said legs in inserted mating relation, wherein said first leg and said first arm are tubular members engaged in telescoping relation, and said second leg and said second arm are tubular members engaged in telescoping relation, wherein:

one of said first leg and said first arm has a first aperture with a first locking button biased to protrude therethrough;

the other of said first leg and said first arm has a second aperture aligned with said first aperture upon said telescoping insertion;

said first locking button protrudes through said first aperture into said second aperture upon said insertion, to lock said first leg to said first arm and prevent withdrawal thereof;

one of said second leg and said second arm has a third aperture with a second locking button biased to protrude therethrough;

the other of said second leg and said second arm has a fourth aperture aligned with said third aperture upon said telescoping insertion; and said second locking button protrudes through said third aperture into said fourth aperture upon said insertion, to lock said second leg to said second arm and prevent withdrawal thereof, wherein:

said first locking button has a locking position protruding beyond said first aperture, and a release position recessed within said first aperture against said bias;

said second locking button has a locking position protruding beyond said third aperture, and a release position recessed within said third aperture against said bias;

and comprising:

a first pre-load member on said one of said first leg and said first arm and holding said first locking button in said release position, and engaged by said other of said first leg and said first arm during said insertion to release said first locking button to said locking position; and a second pre-load member on said one of said second leg and said second arm and holding said second locking button in said release position, and engaged by said other of said second leg and said second arm during said insertion to release said second locking button to said locking position.

6. The tricycle according to claim 5 wherein:

said first pre-load member is a first annular collar slidable along said one of said first leg and said first arm from a release position covering said first aperture to a locking position uncovering said first aperture; and said second pre-load member is a second annular collar slidable along said one of said second leg and said second arm from a release position covering said third aperture to a locking position uncovering said third aperture.

7. In a wheeled cycle having a frame supporting a seat for a rider, a seat-to-frame mounting assembly removably and adjustably mounting said seat to said frame with an insertion motion along the direction of travel of said cycle, said seat-to-frame mounting assembly comprising a bracket on one of said seat and said frame and having a track extending longitudinally along said travel direction, and a locking member on the other of said seat and said frame and movable transversely of said travel direction between a clamping position engaging and clamping said bracket at said track to prevent longitudinal movement of said seat along said frame, and a release position permitting longitudinal movement of said seat along said frame and permitting removal of said seat from said frame, wherein said bracket is on the underside of said seat and has a longitudinal slot providing said track and having a lead-in open end, said locking member is on said frame and includes a shank extending upwardly through said slot and having an upper flange, said shank being movable upwardly and downwardly between a lower locking position with said flange engaging said bracket in clamping relation, and an upper release position permitting said bracket to slide longitudinally, with said shank extending transversely through said longitudinal slot.

8. The cycle according to claim 7 wherein said bracket comprises a plate spaced below said seat and having upper and lower surfaces, said upper surface facing said seat and spaced therefrom by a vertical gap, said lower surface facing said frame, wherein said flange is in said gap and engages said upper surface in said locking position of said shank.

9. The cycle according to claim 8 wherein said shank is a bolt, and said flange is a threaded nut at the top of said bolt.

10. The cycle according to claim 8 wherein said shank extends downwardly through said frame and has a lower cam below said frame and a manually engageable cam lever for camingly engaging and moving said shank between said upper and lower positions.

11. The cycle according to claim 10 comprising a biasing member within said frame and biasing said shank to said upper release position.

12. The cycle according to claim 7 wherein said lead-in open end slot is beveled along a taper to provide a widened entrance throat having a greater lateral width than said slot and guiding entry of said shank into said slot.

13. The cycle according to claim 7 wherein said bracket has a pair of downwardly facing longitudinally extending channels spaced on laterally opposite sides of said slot, and said frame has a pair of upwardly facing longitudinally extending rails on laterally opposite sides of said shank and receiving said channels and supporting said bracket for longitudinal movement therealong.

14. The cycle according to claim 13 comprising a tubular U-shaped member on said frame providing said rails, said U-shaped tubular member having a pair of longitudinally extending tubular legs joined by a laterally extending bight, said bracket having a central portion with said slot therein, and a pair of sidewalls laterally spaced on opposite sides of said slot and extending from said central portion upwardly to said channels.

15. In a wheeled cycle having a frame with a headtube comprising a tubular member extending axially along a steering axis, a front handlebar stem comprising a tubular member extending axially downwardly into said headtube, a front wheel fork yoke comprising a tubular member extending axially upwardly into said headtube, one of said stem and said yoke having an externally extended portion extending axially through and beyond said headtube, a stem-to-yoke mounting assembly external of said headtube and mounting said stem to said yoke, wherein the other of said stem and said yoke has a biased locking member external of said headtube and having a locking position and a release position, and a release band holding said locking member in said release position and engaged by said externally extended portion of said one of said stem and said yoke to release said locking member to said locking position engaging said externally extended portion of said one of said stem and said yoke and locking said stem to said yoke.

16. An assembly method for a tricycle having a longitudinally extending frame supporting a front wheel and a subframe including a rear axle supporting a pair of laterally spaced rear wheels, comprising providing a frame-to-subframe mounting assembly comprising a rear fork having first and second legs extending from said frame toward said subframe, and first and second arms extending from said subframe toward said frame, and comprising engaging said first leg with said first arm and said second leg with said second arm in inserted mating relation, and comprising providing one of said first leg and said first arm longer than the respective one of said second leg and said second arm, and comprising engaging said first leg with said first arm prior to engaging said second leg with said second arm.

17. The method according to claim 16 comprising providing said first arm rigidly mounted to said rear axle, and providing said second arm loosely mounted to said rear axle rotatable relative thereto and axially slidable therealong, and comprising engaging said first leg with said first arm, and then aligning said second arm with said second leg by rotating said second arm relative to said axle and sliding said second arm axially along said axle as needed to align said second arm with said second leg.

18. An assembly method for a wheeled cycle having a frame supporting a seat for a rider, comprising removably and adjustably mounting said seat to said frame with an insertion motion along the direction of travel of said cycle, and comprising providing one of said seat and said frame with a bracket having a track extending longitudinally along said travel direction, and providing the other of said seat and said frame with a locking member, and comprising manually moving said locking member transversely of said travel direction between a clamping position engaging and clamping said bracket at said track to prevent longitudinal movement of said seat along said frame, and a release position permitting longitudinal movement of said seat along said frame and permitting removal of said seat from frame, and comprising providing said bracket on the underside of said seat, providing said bracket with a longitudinal slot forming said track and having a lead-in open end, providing said locking member on said frame including a shank extending upwardly through said slot and having an upper flange, providing said lead-in open end slot with a bevel along a taper to provide a widened entrance throat having a greater lateral width than said slot, and comprising mounting said seat to said frame by inserting said seat along the direction of travel of said cycle by sliding said bracket at said track longitudinally along said shank by guiding entry of said shank into said slot along said beveled taper along said widened entrance throat and then longitudinally sliding said slot along said shank.

19. An assembly method for a wheeled cycle having a frame with a headtube comprising a tubular member extending along a steering axis, a front handlebar stem comprising a tubular member, a front wheel fork yoke comprising a tubular member, comprising inserting said yoke axially upwardly into said headtube and inserting said stem axially downwardly into said headtube with one of said stem and said yoke having an externally extended portion extending axially through and beyond said headtube, and mounting said stem to said yoke externally of said headtube, and comprising providing one of said stem and said yoke with a biased locking member having a locking position and a release position, providing a release band holding said locking member in said release position, and comprising engaging said release band by said externally extended portion of said one of said stem and said yoke to release said locking member to said locking position engaging said externally extended portion of said stem and said yoke and locking said stem to said yoke.

* * * * *